United States Patent [19]
Bouchnik

[11] 3,738,595
[45] June 12, 1973

[54] DELTA-WING AIRCRAFT

[76] Inventor: Joseph Bouchnik, Mashay Mismeret, Gush Tel-Mond, Israel

[22] Filed: Oct. 12, 1970

[21] Appl. No.: 79,740

[30] Foreign Application Priority Data
Oct. 14, 1969 Italy.............................33185/69

[52] U.S. Cl. ............................................... 244/43
[51] Int. Cl. ............................................ B64c 3/56
[58] Field of Search ................. 244/43, 49, 42, 41, 244/40, 25, 35, 34, 39, 46

[56] References Cited
UNITED STATES PATENTS

| | | | |
|---|---|---|---|
| 2,430,793 | 11/1947 | Wells | 244/87 |
| 2,941,752 | 6/1960 | Gluhareff | 244/46 |
| 3,478,989 | 11/1969 | Bielefeldt | 244/43 |
| 3,104,079 | 9/1963 | Phillips | 244/43 |
| 3,104,082 | 9/1963 | Polhamus | 244/43 |
| 2,793,826 | 5/1957 | Fieldler | 244/43 |

FOREIGN PATENTS OR APPLICATIONS

| 1,083,557 | 11/1955 | France | 244/46 |
|---|---|---|---|

Primary Examiner—Duane A. Reger
Assistant Examiner—Carl A. Rutledge
Attorney—Benjamin J. Barish

[57] ABSTRACT

A delta-wing aircraft comprises a pair of auxiliary wings pivotably mounted forwardly of the leading edge of the delta-wing from a deployed position at lower speeds wherein they increase lift and also act as horizontal stabilizers, to a retracted drag-decreasing position at cruising speeds. In one described embodiment, the auxiliary wings are pivotable about a vertical axis of the aircraft from a deployed position wherein their leading edges are about 90° to the longitudinal axis of the aircraft, to a retracted position wherein they form the apex of the delta-wing; in both positions, the mean aerodynamic chord of the auxiliary wings is aligned with that of the delta-wing. In a second described embodiment, the pair of auxiliary wings are pivoted about a horizontal axis of the aircraft, from a deployed position substantially perpendicular to the longitudinal axis of the aircraft, to a retracted position substantially flush with the aircraft fuselage.

4 Claims, 10 Drawing Figures

Patented June 12, 1973
3,738,595
2 Sheets-Sheet 1
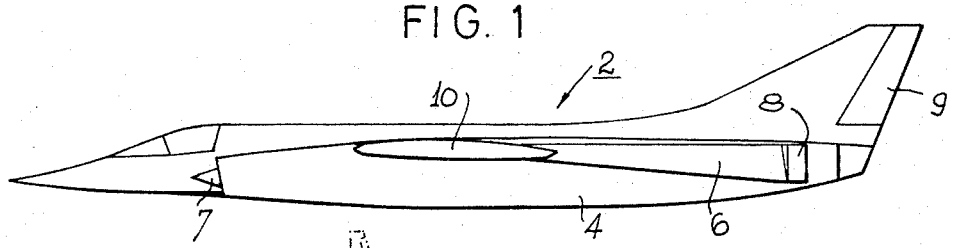
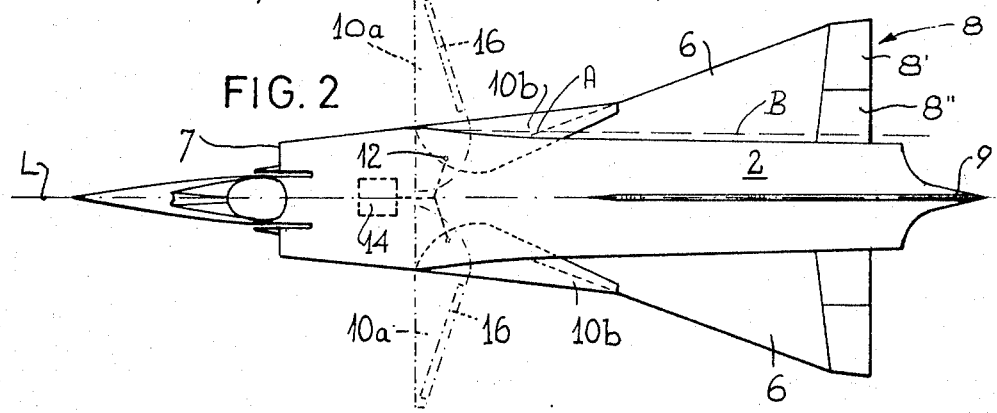
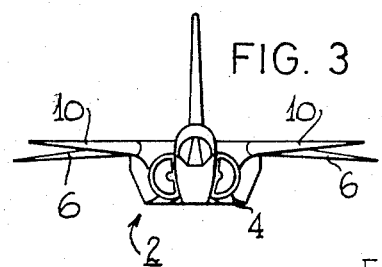
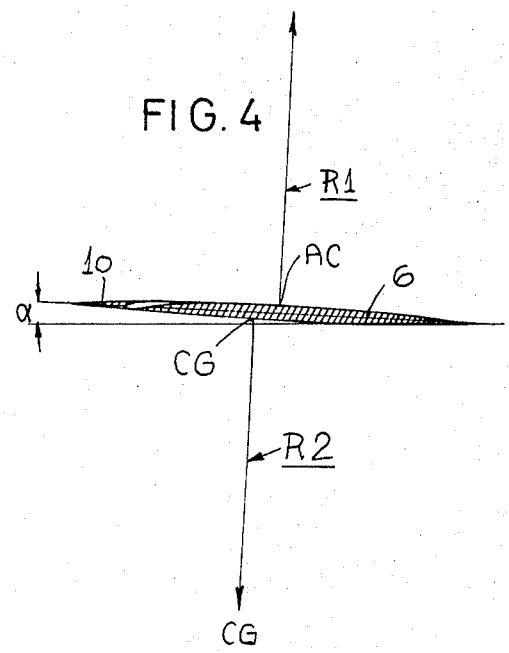
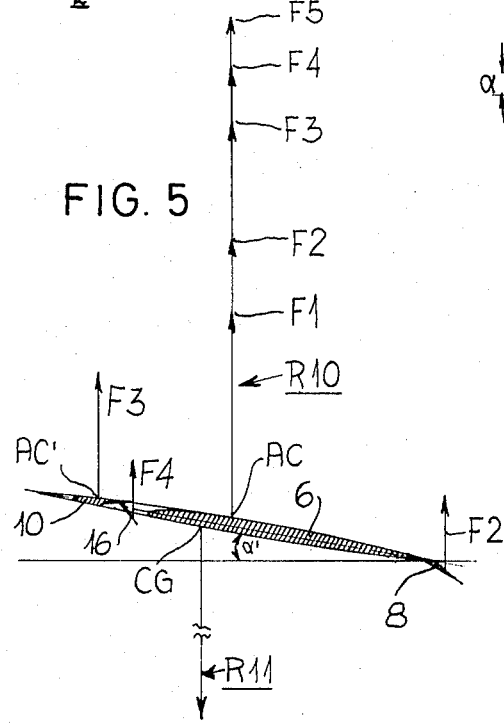
INVENTOR
JOSEPH BOUCHNIK
BY
ATTORNEY Patented June 12, 1973 3,738,595
2 Sheets-Sheet 2
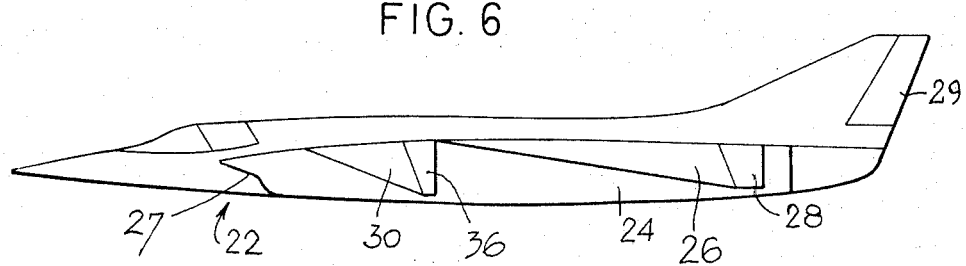
FIG. 6
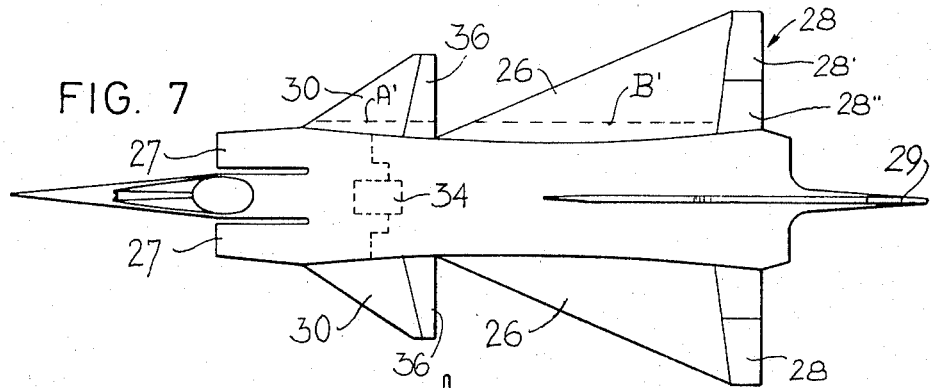
FIG. 7
FIG. 8
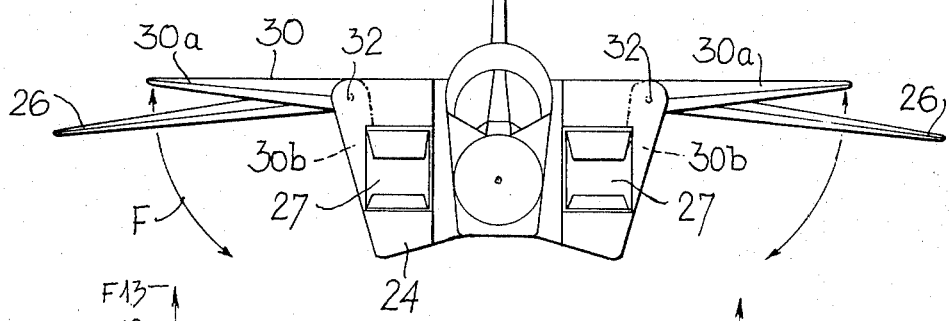
FIG. 10
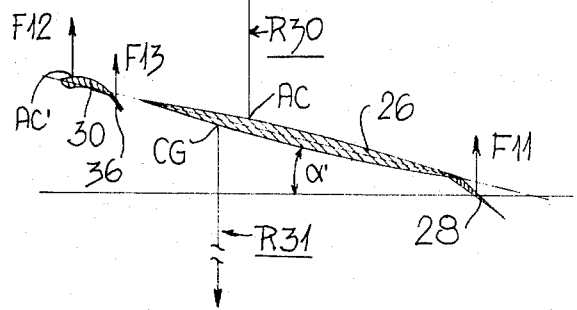
FIG. 9
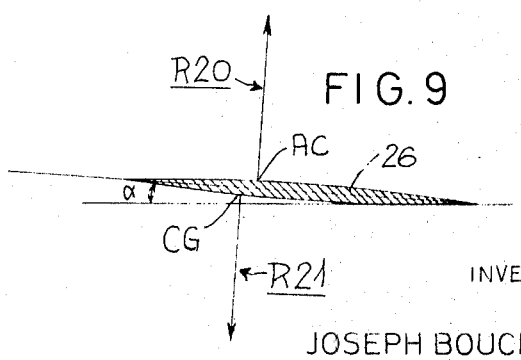
INVENTOR
JOSEPH BOUCHNIK
BY
ATTORNEY

DELTA-WING AIRCRAFT

BACKGROUND OF THE INVENTION

1. Field of the Invention

The present invention relates to supersonic delta-wing aircraft.

2. Description of the Prior Art

Delta-wing aircraft designed for supersonic flight require long runways for take-off and landing, and therefore various arrangements have been proposed for reducing their take-off and landing speeds. The French Mirage Type III delta-wing is equipped with aelerons and elevons at the rear edge of the delta-wing which are in elevated positions during take-off and landing so as to obtain the required lift at lower speeds. The F-111 has variable sweep-back wings, in that during take-off and landing the entire wing is moved forwardly so as to provide a larger lift, and at cruising speed the wings are retracted forming a delta-shaped wing. The Swedish Viggen 37 is a delta-wing aircraft provided with flaps used for increasing the lift during take-off and landing, and including a fixed canard or stabilizer located at the forward part of the plane which is advantageous during take-off and landing but disadvantageous at cruising speeds. A similar arrangement has been proposed for the B-70.

SUMMARY OF THE PRESENT INVENTION

According to a broad aspect of the present invention, there is provided a delta-wing aircraft characterized in that it includes a pair of canard control surfaces or auxiliary wings pivotably mounted forwardly of the leading edge of the delta-wing from a deployed position at lower speeds wherein they increase lift and also act as horizontal stabilizers, to a retracted drag-decreasing position at cruising speeds.

In a preferred embodiment of the invention described below, called the "variable-delta" configuration, the auxiliary wings are mounted for pivoting about a vertical axis of the root of the main delta wing of the aircraft, such that the mean aerodynamic chord of the auxiliary wings is in alignment with that of the delta-wing in both the deployed and retracted positions of the auxiliary wings, and that pivoting them in the direction of the deployed position increases the total surface area aspect ratio, camber and effective thickness of the main delta wing and auxiliary wings, and the angle of their leading edges to the direction of flight. In this embodiment it is possible to vary the position of the auxiliary wings to any one of a plurality of intermediate positions between the fully deployed position and the fully retracted position, thus providing for intermediate values of additional lift and stabilization whenever required.

A second embodiment of the invention is also described wherein the pair of canard control surfaces are mounted for pivoting about a horizontal axis parallel to the longitudinal axis of the aircraft. In this embodiment, they are mounted for pivoting from a deployed position substantially perpendicular to the longitudinal axis of the aircraft, to a retracted position substantially flush with the aircraft fuselage.

Further features and advantages of the invention will be apparent from the description below.

BRIEF DESCRIPTION OF THE DRAWINGS.

The invention is herein described, somewhat diagrammatically and by way of example only, with reference to the accompanying drawings, wherein:

FIG. 1 is a side elevational view of a delta-wing aircraft constructed with a pair of auxiliary wings pivotably mounted about a vertical axis in accordance with one embodiment of the present invention;

FIG. 2 is a plan view of the aircraft of FIG. 1, the auxiliary wings being shown in their retracted position in full lines, and in their deployed position in broken line;

FIG. 3 is a front elevational view of the aircraft of FIGS. 1 and 2, the auxiliary wings being shown in their deployed position;

FIG. 4 is a schematic, non-scale diagram illustrating the main vertical forces applicable to the airfoil section of the aircraft of FIGS. 1-3, at the mean aerodynamic chord thereof, with the auxiliary wings in their retracted position;

FIG. 5 is a diagram similar to that of FIG. 4, but showing the main vertical forces applicable when the auxiliary wings are in their deployed position;

FIG. 6 is a side elevational view of a delta-wing aircraft constructed in accordacne with a second embodiment of the invention, with a pair of auxiliary wings pivotably mounted about a horizontal axis parallel to the longitudinal axis of the aircraft; FIGS. 7 and 8 are plan and front elevational views, respectively, of the aircraft of FIG. 6, illustrating the auxiliary wings in their deployed position; and FIGS. 9 and 10 are diagrams similar to those of FIGS. 4 and 5 but showing the vertical forces applicable to the aircraft of FIGS. 6-8 when the auxiliary wings are in their retracted and deployed positions, respectively.

DESCRIPTION OF THE EMBODIMENT OF FIGS. 1-5.

The aircraft 2 illustrated in FIGS. 1-3 is termed a "variable-delta" configuration. It comprises a fuselage 4, a fixed delta-wing 6, air-intakes 7, rear flaps 8 including ailerons 8' for roll control and elevons 8'' for pitch control at high speeds, directional rudder 9, and a pair of auxiliary wings 10 pivotably mounted forwardly of the leading edge of the delta-wing 6, between it and the air-intakes 7. In this embodiment, the forward stabilizers 10 are mounted for pivoting about a vertical axis 12 at the root of the main delta-wing 6 of the aircraft from the deployed position 10a shown in broken lines in FIG. 2, to the retracted position 10b shown in full lines in FIG. 2, or to any one of a number of intermediate positions. Any suitable power means, such as hydraulic system, provided on the aircraft may be used for actuating the auxiliary wings 10 as schematically indicated by the block 14 in FIG. 2.

The auxiliary wings 10 are so disposed that their mean aerodynamic chord A is in alignment with the mean aerodynamic chord B of the delta-wing in the deployed and retracted positions, as well as in all intermediate positions. They carry control flaps 16 at their trailing edges, which flaps may also include spoilers (not shown), for roll-axis control.

The deployed position 10a of the auxiliary wings is used for low speeds, such as at take-off or landing, and also at very high altitudes; whereas the retracted position 10b is used for normal cruising speed.

When the auxiliary wings 10 are moved to their deployed position, the total wing surface area and aspect ratio are increased; also the angle of incidence of their leading edges to the direction of flight (i.e. longitudinal axis L, FIG. 2) is increased and their chord is decreased, thereby producing an increase in the camber and thickness of the auxiliary wings and delta-wing profiles. This produces an increase in the lift coefficient, which is greatest when the leading edges of the auxiliary wings are at right angles to the direction of flight. Accordingly, the fully deployed position, of the auxiliary wings is about 90° to the longitudinal axis L of the aircraft, but it may be slightly more in some applications, for example, up to about 105°, to provide longitudinal stability control.

In the retracted position 10b of the auxiliary wings 10, a part of their surface area overlies (or underlies) the front part of the delta-wing and may also enter the fuselage, whereby the effective surface area of the auxiliary wings is substantially reduced, e.g. about two-thirds, as compared to the deployed position. The auxiliary wings in the retracted position form the apex of the delta-wing, and preferably have a sharper sweepback than the delta-wing proper. For example, in an aircraft having a delta-wing of about 60° sweep-back (i.e. forming an angle of 30° with respect to the aircraft longitudinal axis L), the leading edge of the auxiliary wings 10 in their fully retracted position could have about a 10° sharper sweep-back (i.e. a 70° sweep-back). Preferably the sweep-back of the delta-wing may vary from 60°–65°; and that of the apex formed by the retracted auxiliary wings may vary from 70°–85°.

It will thus be seen that deploying the auxiliary wings increases lift. It also has a horizontal stabilizing effect against pitch movements. Thus, when the auxiliary wings are forwardly deployed, the aerodynamic center of the delta-wing proper tends to move aft, increasing the distance from the aircraft center of gravity, and thereby tending to produce a nose-down movement. The auxiliary wings have an independent aerodynamic center which is forward of the center of gravity, and therefore the lift force of the auxiliary wings tends to compensate the nose-down movement of the delta-wing.

FIG. 4 illustrates, schematically and in non-scale, the vertical forces applicable to the airfoil section of both the delta-wing and the auxiliary wings when the latter are in their retracted position, the plane flying at high speed with a small angle of flight ($\alpha$). The resultant lift force R1 applicable to the aerodynamic center AC of the wing is that produced by both the delta-wing 6 and auxiliary wings 10. The latter is the apex of the delta-wing, and therefore its lift force is not shown separately. The resultant gravity force R2 is applicable at the center of gravity CG of the aircraft, which is slightly forward of the aerodynamic center AC. The characteristics of the aircraft at high speed, with the auxiliary wings retracted, thus resemble those of a pure delta-wing aircraft.

FIG. 5 illustrates the vertical forces applicable upon landing or take-off with the auxiliary wings in their deployed positions, and with a maximum angle of attack ($\alpha'$) of about 15°. The resultant delta-wing lift force, indicated by arrow R10 at the aerodynamic center AC of the aircraft, comprises force F1 produced by the delta-wing 6, force F2 produced by the delta-wing flaps 8, force F3 produced by the deployed auxiliary wings 10, and force F4 produced by flaps 16. The latter two forces are at the independent aerodynamic center AC' of the auxiliary wings. The additional force resulting from the increase in camber and thickness of the profiles of the auxiliary wings and of the delta wings is indicated by force F5. The resultant gravity force is indicated by arrow R11 passing through the center of gravity CG of the aircraft, which is slightly forward of the aerodynamic center AC of the aircraft, but behind the aerodynamic center AC' of the deployed auxiliary wings.

DESCRIPTION OF THE EMBODIMENT OF FIGS. 6–10.

The aircraft 22 of FIGS. 6–10 comprises a fuselage 24, a delta-wing 26, air-intakes 27, rear flaps 28 including ailerons 28' for roll control and elevons 28'' for pitch control at high speeds, directional rudder 29, and a pair of auxiliary wings 30 pivotably mounted forwardly of the leading edge of the delta-wing 26 between it and the air-intakes 27. As distinguished from the "variable-delta" configuration of FIGS. 1–5, the auxiliary wings 30 in the embodiment of FIGS. 6–10 are mounted for pivoting about a horizontal axis 32 parallel to the longitudinal axis of the aircraft, from the deployed position 30a shown in full lines in FIG. 8 to the retracted position 30b shown in broken lines in FIG. 8. Any suitable power means, such as a hydraulic system, provided on the aircraft may be used for actuating the auxiliary wings 30 as schematically indicated by the block 34 in FIG. 7.

The auxiliary wings 30 are so disposed that their mean aerodynamic cord A' is in alignment with the mean aerodynamic cord B' of the delta-wing in the deployed position of the auxiliary wings as shown in FIG. 7. The auxiliary wings are moved against and flush with the fuselage, so as to be ineffective, in their retracted position. As in the embodiment of FIGS. 1–5, auxiliary wings 30 are also provides with flaps 36 at their trailing edges which may include spoilers (not shown).

The auxiliary wings 30 are moved to their deployed position 30a at take-off or landing, and also at very high altitudes, when the additional lift produced by them is required. During normal supersonic cruising of the aircraft, the auxiliary wings are pivoted downwardly, as shown by arrow F in FIG. 8, to their retracted position 30b flush against the fuselage 24 to minimize drag. It is desirable to provide recesses in the fuselage for receiving the auxiliary wings in their retracted position.

The diagram of FIG. 9 illustrates, schematically and in non-scale, the resultant vertical forces applicable to the aircraft when the auxiliary wings are in their retracted position, the plane flying at high speed with a small angle of flight ($\alpha$). Thus, the auxiliary wings 30 in this position are ineffective to produce any lift, and therefore the resultant lift force R20 is indicated as that produced by the delta-wing 26 alone applied to the aerodynamic center AC, as in a pure delta-wing aircraft. The gravity force is indicated by arrow R21 applied to the center of gravity CG of the aircraft, which is slightly forward of the aerodynamic center AC.

FIG. 10 illustrates the vertical forces applicable when the auxiliary wings are in their deployed position, and with a maximum angle of attack ($\alpha'$) of about 15°. Thus, the resultant lift force R30 applied to the aerodynamic center AC of the aircraft is the resultant of force F10 produced by the delta-wing 26, force F11 produced by the wing flaps 28, force F12 produced by the deployed auxiliary wings 30, and force F13 produced by flaps 36. The gravity force is indicated by the arrow R31 passing through the center of gravity CG of the aircraft, again slightly forward of AC but behind AC', the latter being the independent aerodynamic center of the auxiliary wings.

As indicated earlier, the area of the auxiliary wings in both embodiments can be varied within wide limits in accordance with the size and required characteristics of the particular aircraft, the latter also determining the surface area of the delta-wing proper, as known per se. The size of such auxiliary wings will also depend upon their position in the aircraft. Thus, the further forward they are mounted the smaller will be their surface area; and the further aft, the larger will be their surface area. Usually the surface area of the auxiliary wings will constitute about 10–20 percent of the surface area of the delta-wing.

Preferably, the forward auxiliary wings are located between the air-intakes and the delta-wing, but when the engines are located in the main delta-wing, they may be located in front of the air-intakes.

Many variations, modifications and other applications of the illustrated embodiments will be apparent.

What is claimed is:

1. An aircraft comprising a fuselage and a main delta wing fixed to the fuselage, characterized in that the aircraft includes a pair of auxiliary wings each pivotably mounted about a vertical axis at the forward juncture of the main delta wing with the fuselage, said auxiliary wings being pivotable from a deployed position at lower speeds to a retracted position at cruising speed and constituting the apex of the main delta wing when in said retracted position, the mean aerodynamic chord of said auxiliary wings being in alignment with that of the main delta wing in both the deployed and retracted positions of said auxiliary wings, said auxiliary wings when in said deployed position, increasing the total surface area, aspect ratio, camber, and effective thickness of the total wing surface area including the main delta wing and the auxiliary wings, thereby increasing lift and horizontal stabilization of the aircraft.

2. An aircraft as defined in claim 1, wherein the surface area of said pair of auxiliary wings constitute about 10–20 percent of the surface area of the main delta wing.

3. The aircraft as defined in claim 1, wherein said auxiliary wings carry control flaps at their trailing edges.

4. The aircraft as defined in claim 1, wherein said auxiliary wings may be pivoted to a fully deployed position so that their leading edges form an angle of at least about 90° to the longitudinal axis of the aircraft.

* * * * *